Oct. 17, 1961  B. L. STEIERMAN  3,004,679
CONTAINER FOR RADIATION STERILIZED PRODUCTS
Filed Dec. 15, 1958

INVENTOR.
BERNARD L. STEIERMAN
BY
W. A. Schaich
J. D. Soubier

United States Patent Office 3,004,679
Patented Oct. 17, 1961

3,004,679
CONTAINER FOR RADIATION STERILIZED PRODUCTS
Bernard L. Steierman, Toledo, Ohio, assignor to Owens-Illinois Glass Company, a corporation of Ohio
Filed Dec. 15, 1958, Ser. No. 780,417
3 Claims. (Cl. 215—1)

This invention relates to an improved container for products such as foods and medicines whose storage, sterility or other properties may be benefited by subjection to high energy radiation.

It has been recently determined that the application of high energy radiation such as alpha, beta, gamma rays, X-rays, neutrons, protons, electrons and the like have very beneficial effects on certain products. Various food products, for example, can have their storage life substantially increased by being subjected to radiation. In fact, radiation sterilization has become increasingly important in the packaging of medicinal preparations. Of course, when reliance is placed upon the beneficial effects of radiation on a product disposed in a sealed container, it is essential that some convenient means be provided to accurately indicate that the contents of such container have actually been subjected to the desired radiation. Containers fabricated from glass or similar vitreous materials are greatly preferred for long time storage due to their high degree of chemical inertness and their resistance to atmospheric corrosion.

Accordingly, it is an object of this invention to provide an improved glass container for products requiring high energy radiation treatment.

A further object of this invention is to provide a glass container for radiation sterilized products which economically incorporates an accurate indication of the fact that the contents of such container have been subjected to high energy radiation.

A particular object of this invention is to provide a glass container with a localized layer of a second glass bonded to a portion of its wall to concurrently impart the property of controlled frangibility to such wall portion and to operate as a radiation treatment indicator.

The specific nature of this invention, as well as other objects and advantages thereof, will become apparent to those skilled in the art from the following detailed description taken in conjunction with the annexed sheet of drawings on which, by way of preferred example only, are illustrated three modifications of this invention.

In accordance with this invention, a container for a product which is to be treated with high energy radiation is formed with a hollow body envelope 10 fabricated from glass or a similar vitreous material. Preferably, the glass utilized is transparent in order to permit convenient inspection of the contents of the container. The glass composition preferably incorporates a quantity of cerium oxide, cobalt oxide or similar material which has the property of stabilizing the glass against coloration by the high energy radiation to which the contained product is to be subjected. Hence, the subsequent exposure of the product and the container to the high energy radiation will not affect the coloring or transparency of the body envelope 10. The amount of stabilizer, e.g. cerium oxide and other similar materials, included in the base composition is in general that amount which will yield a glass stabilized against coloration by the high energy radiation. In the case of cerium oxide, 0.1% to 3% by weight over and above the composition identified as (A), (C), (D), and (E) in col. 3 of Smith, Patent No. 2,517,604, are satisfactory.

The analyses of these compositions are listed below in Table I

Table I

| | (A) | (C) | (D) | (E) |
|---|---|---|---|---|
| SiO₂ ............percent.. | 74.7 | 67.6 | | 68.6 |
| B₂O₃ ..................do.... | 9.6 | 1.5 | | 2.2 |
| Al₂O₃ .................do.... | 5.6 | 2.8 | 18.0 | 2.0 |
| ZnO ...................do.... | 0.1 | | 10.0 | 6.8 |
| MgO ..................do.... | | 4.0 | | .1 |
| CaO ..................do.... | 0.9 | 5.6 | | .5.7 |
| Na₂O .................do.... | 6.4 | 15.1 | | 14.5 |
| K₂O ..................do.... | 0.5 | 1.3 | | .4 |
| Sb₂O₃ .................do.... | 0.009 | | | |
| Fe₂O₃ ................do.... | | | | |
| MnO ..................do.... | | | | |
| BaO ..................do.... | 2.2 | 1.9 | | |
| P₂O₅ ..................do.... | | | 72.0 | |
| As₂O₅ ................do.... | 0.027 | | | |
| Coefficient of Expansion.... | 50×10⁻⁷ | 92×10⁻⁷ | 59×10⁻⁷ | 88×10⁻⁷ |
| Softening Temperature, °C.. | 653 | 590 | 675 | 600 |
| Annealing Temperature, °C. | 575 | 520 | 605 | 536 |

Figure 1:
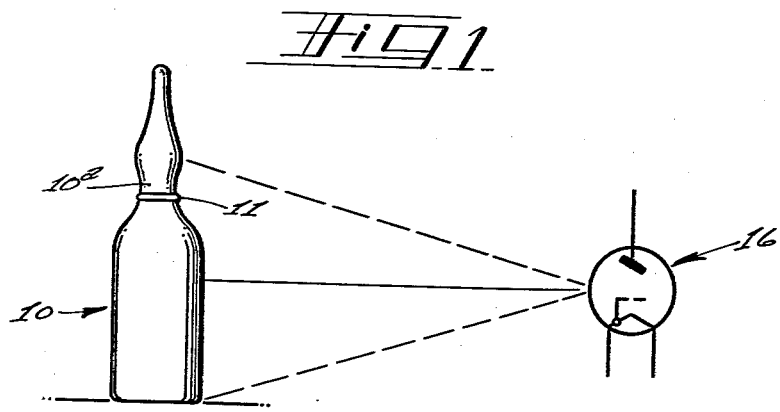
FIG. 1 is a side elevational view of a glass container embodying this invention together with a schematic indication of a source of high energy radiations.
Figures 2, 3:
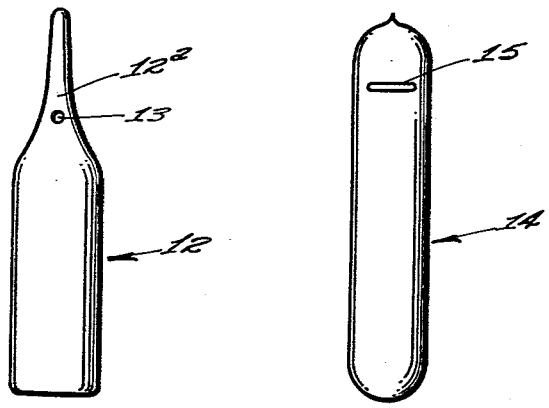
FIGS. 2 and 3 are respectively elevational views of glass containers embodying modified forms of this invention.

Additionally, a layer 11 of a second glass composition is applied to a localized area of the hollow body envelope 10 at which a controlled breakage of the wall of the envelope is desired to obtain access to the contained product. In the modification illustrated in FIG. 1, the hollow envelope 10 is shown as having the restricted neck configuration 10a commonly found in ampules. The second glass layer 11 may be conveniently applied in a form of a ring at least partially surrounding the restricted neck portion 10a. In the modification of FIG. 2 the hollow body envelope 12 is in the form of a tapered end ampule and the layer of second glass 13 is in the form of a dot on a medial portion of the tapered end 12a of such ampule. In the modification of FIG. 3, the hollow body envelope partakes the shape of a capsule 14, and the layer of second glass 15 is in the form of a narrow strip adjacent one end of the capsule 14.

In all modifications of this invention, the composition of the second glass or similar vitreous material is selected to provide two distinct properties. In the first place, the composition is such that coloration of the second glass will be produced by the incident high energy radiation. Additionally, the composition is selected to provide a coefficient of contraction of the second glass which is substantially greater than the coefficient of the contraction of the glass forming the hollow body envelope. The difference in such coefficients of contraction is selected in accordance with the teachings of Smith Patent No. 2,517,604 (which are hereby incorporated herein) so that when the second glass is heat bonded to the glass of the hollow body envelope and then cooled to ambient temperature, the hollow body envelope glass immediately beneath the layer of second glass is placed under a predetermined degree of compressive stress. In this manner, a controlled weakening of the hollow body envelope at the vicinity of the layer of the second glass is produced in accordance with teachings of the aforementioned Smith patent, and the container may be readily opened with the fingers by applying a bending stress in the locality of the layer of second glass. More specifically, as an example of a composition of the second glass, there may be conveniently used the formulation appearing in Table II.

Table II

|  | Percent |
|---|---|
| Silica | 30.0 |
| Boron oxide | 6.5 |
| Aluminum oxide | 2.0 |
| Zinc oxide | 7.0 |
| Lead oxide | 50.0 |
| Sodium oxide | 3.5 |

In addition, the glass compositions identified as (a), (b) or (c) in col. 3 of Smith Patent No. 2,517,604 are satisfactory. The analyses of compositions (a) and (b) are listed below in Table III.

Table III

|  | (a) | (b) |
|---|---|---|
| $SiO_2$ percent | 27.9 | 27.2 |
| $B_2O_3$ do | 4.2 | 2.9 |
| $Al_2O_3$ do | 1.3 | 0.84 |
| $TiO_2$ do | 12.5 | |
| ZnO do | | 2.3 |
| PbO do | 48.3 | 51.0 |
| CaO+MgO do | 0.16 | 0.17 |
| $Na_2O$ do | 2.9 | 1.08 |
| $K_2O$ do | 0.19 | 0.22 |
| $Li_2O$ do | 0.73 | |
| S do | | 0.86 |
| $Cr_2O_3$ do | | 5.6 |
| CoO do | | 1.2 |
| CdO do | | 7.2 |
| $As_2O_3$ do | | .1 |
| $Sb_2O_5$ do | 0.58 | |
| Coefficient of Expansion | $86 \times 10^{-7}$ | $73 \times 10^{-7}$ |
| Softening Temperature, ° C | 463 | 484 |

Composition (c) for forming the second glass is composed of lead chloride. It softens at about 501° C., has a linear coefficient of thermal expansion of about $298 \times 10^{-7}$ per °C. over the temperature range from room temperature to 300° C. and consists of 74.5% lead and 25.5% chlorine.

With all modifications of this invention, the product (not shown) which is to be treated with high energy radiations and stored in the glass container is inserted through an opened end of the hollow body envelope 10, 12, or 14, as the case may be, and such opened end is then heated and closed to provide an integral seal. The entire container is then subjected to the action of radiation emitted by suitable source indicated schematically at 16 in FIG. 1. Such radiation produces no effect upon the glass of the hollow body envelope but it does effect the desired sterilization or other beneficiation of the product contained within the hollow body envelope. Concurrently, the radiation effects a coloration of the second glass 11, 13, or 15, as the case may be, and this coloration provides a positive, readily recognizable indicia of the fact that the contained product has been exposed to radiation.

When the contained product is to be used, the user merely applies a bending stress to the wall of the hollow body envelope in the vicinity of the layer of the second glass and such wall portion will readily break to provide access to the contained product.

It will, of course, be understood that various details of construction may be modified through a wide range without departing from the principles of this invention, and it is, therefore, not the purpose to limit the patent granted hereon otherwise than necessitated by the scope of the appended claims.

This is a continuation-in-part application of my application, Serial No. 533,089, filed September 8, 1955, now abandoned.

I claim:

1. A glass container for radiation sterilized products comprising a hollow body envelope formed of a transparent glass stabilized against coloration when subjected to high energy radiation and thus having the property of not undergoing coloration when subjected to high energy radiation, and a layer of a colorless glass bonded to a localized area of said hollow body envelope where controlled breakage of the envelope wall is desired, said colorless glass being susceptible to coloration by high energy radiation and having a coefficient of contraction greater than that of said hollow body envelope glass.

2. A glass container for radiation sterilized products comprising a hollow body envelope formed of a transparent glass stabilized against coloration when subjected to high energy radiation and thus having the property of not undergoing coloration when subjected to high energy radiation, and a layer of a second glass bonded to a localized area of said hollow body envelope where controlled breakage of the envelope wall is desired, said second glass being susceptible to change in coloration by high energy radiation and having a coefficient of contraction greater than that of said hollow body envelope glass.

3. A glass container for radiation sterilized products comprising a hollow body envelope formed of a transparent glass containing a minor amount of cerium oxide whereby it is stabilized against coloration when subjected to high energy radiation, and a layer of a colorless glass bonded to a localized area of said hollow body envelope where controlled breakage of the envelope wall is desired, said colorless glass being susceptible to change in coloration by high energy radiation and having a coefficient of contraction greater than that of said hollow body envelope glass.

References Cited in the file of this patent

UNITED STATES PATENTS

| 2,515,938 | Stookey | July 18, 1950 |
| 2,517,604 | Smith | Aug. 8, 1950 |
| 2,722,519 | Otley et al. | Nov. 1, 1955 |